United States Patent Office 3,419,345
Patented Dec. 31, 1968

3,419,345
NEUTRALIZATION OF HYDROPHILIC GEL FIBERS OF A CELLULOSE DERIVATIVE
Esperanza Guandique Parrish, Wilmington, Del., assignor to E. I. du Pont de Nemours and Company, Wilmington, Del., a corporation of Delaware
No Drawing. Continuation-in-part of application Ser. No. 148,066, Nov. 27, 1961. This application May 4, 1966, Ser. No. 547,455
8 Claims. (Cl. 8—137.5)

ABSTRACT OF THE DISCLOSURE

A method for neutralizing acidic or alkaline structures of freshly formed highly swellable hydrophilic gel fibers of a cellulose derivative produces a saft, pliable highly absorbent product. Neutralization is accomplished by intimately contacting the freshly formed unswollen fiber with an aqueous concentrated buffered salt solution, e.g., contacting with an aqueous solution of from 15 to 30% by weight of sodium sulfate containing a disodium hydrogen phosphate buffer.

---

This is a continuation-in-part of U.S. Ser. No. 148,066, filed Oct. 27, 1961.

This invention relates to process. More specifically, it relates to a process for neutralizing a freshly formed, highly swellable, hydrophilic gel fiber of a cellulose derivative.

Highly hydrophilic fibers, for example, from cellulose ethers, are old in the art. In one method of preparation they are made by spinning an alkaline xanthate solution into an acid bath to regenerate the ether. In another process, a cellulosic fiber such as cotton is etherified by surface application of alkali and an etherifying agent. Neutralization of the acid or alkaline structures so formed has presented a problem due to the tendency of the fibers to swell in the presence of water. Such fibers and structures containing them have not been satisfactory for use as absorbing materials in contact with the body when an aqueous step has been included in the processing either to make the sheet or to bind it due to the harsh, parchment-like structure that is obtained.

In accordance with the present invention a highly swellable, hydrophilic gel fiber of a cellulose derivative is neutralized by intimately contacting the freshly formed unswollen fiber with an aqueous, concentrated, buffered, salt solution. The "freshly formed" fiber can be (1) a structure completely regenerated in fibrous form by passing (e.g., spinning) an alkaline xanthate into an acid bath to coagulate and regenerate the cellulose ether or (2) an etherified fiber of cellulose, the chemical constitution of which has been accomplished by surface treatment with an etherifying agent of a cellulosic fiber without complete destruction of its original morphology. By "freshly formed" is meant that the cellulose derivative treated has been neither dried, nor swollen by contact with water, prior to neutralization in accordance with the present invention. The nature of the "salt" of the "aqueous, concentrated salt solution" of the process of the present invention may vary widely.

The cation of the salt is preferably multivalent but univalent cations are suitable. The necessary water solubility and cost restricts the practical cations to magnesium, ammonium and sodium although other alkali metals would be suitable.

The anion of the salt is preferably multivalent such as sulphate, citrate, borate and phosphate. With a multivalent cation, univalent anions of the class acetate and chloride can be used. Acetates of alkali metals may also be used but are not preferred.

The salt solution should be at least 0.7 molar and preferably at least about 1.2 molar (e.g., about 15% $Na_2SO_4$) and is generally used at 30 to 60° C. or higher to minimize precipitation of the salt. 30% salt is often suitable.

If the highly hydrophilic fiber contains ionic substituents that can yield an anionic group on the fiber (e.g., carboxylic or sulfonate), the use of a multivalent cation salt will cause cross-linking which will decrease the absorbency of the dried product. A monovalent cation should be used in this case.

Buffering action is supplied to the salt solution using a conventional buffering salt. Suitable systems will be obvious to those skilled in the art and include the following to mention a few: potassium acid phthalate-dipotassium phthalate (pH 5.0–6.2), sodium dihydrogenphosphate-disodium hydrogen phosphate (pH 5.9–8.0), boric acid-Borax (pH 6.8–9.0), disodium hydrogen phosphate-citric acid (pH 5–8), citric acid-sodium citrate, and sodium bicarbonate-$Na_2CO_3$. Such systems are normally made by titrating one of the components with a strong base or acid to the desired pH level.

The invetnion will be more readily understood by reference to the drawing which is a schematic illustration of the device employed in Example 1. Parts of the device are particularly identified in the example.

Testing procedures

Samples used for tensile tests, basis weight and bending length determinations are conditioned at 70° F. (21° C.) and 65% relative humidity for at least 24 hours before testing under these conditions.

Tensile strengths and elongations are measured on 0.5 x 2 inch samples at an elongation of 50% per minute on an Instron testing machine. The results in pounds/inch, hereafter designated as lbs./in., are divided by the basis weight to give a normalized result.

Samples are soaked for 5 minutes in distilled water at 21° C. and then clamped in the tester and broken in air to determine wet strip-tensile strength.

Bending length is 0.5 the length of a strip of sample that bends under its own weight to a 45° angle. It is determined on a 1 x 6 inch sample on a Drape-Flex Stiffness Tester (made by Fabric Development Tests, Brooklyn, N.Y.).

Basis weights are expressed in ounces/square yards, hereafter designated as oz./yd.$^2$, and are based on the weight of the water-insoluble fibers present unless otherwise stated.

The liquid absorption of all samples is determined by soaking a small sample in an excess of the liquid at 25° C. unless otherwise designated (1 g. in 3000 g. of water) for about 5 minutes. The sample is removed from the liquid and spread out to cover a 5 x 5 cm. area on bleached sulfiite blotter paper. The sample is placed between layers of blotter paper and loaded with a 3 kilogram weight to give a pressure of 120 g./cm.$^2$. Pressure is applied for five minutes after which the sample is removed and weighed, giving the wet weight. Then the sample is dried to constant weight using a Noble and Woods sheet dryer at 100° C. Absorbency equals the water absorbed (wet weight minus dry weight) divided by the dry weight.

All absorbencies of urine are measured in a salt solution of essentially the same composition as human urine [16 g. NaCl, 35 g. urea, 2 g. $MgSO_4$, and 3 g. $Ca(H_2PO_4)_2H_2O$ per liter of solution in distilled water]. All water absorbencies are measured in distilled water unless otherwise stated.

The dispersibility is determined in a 250 ml. filter flask having a side arm at the bottom of the wall and containing a magnetically rotated bar. The bar is 3.8 cm. long by 8 mm. in diameter, weighs 11.73 grams and is rotated at 485 revolutions per minutes. A 3 x 3-inch sample is folded in half and inserted under the surface of the water (at the top side arm). Tap water at about 25° C. is added through the bottom tube at a rate of 0.70 liters/minute for a period of 2 minutes. The effluent liquid from the upper side arm is filtered and the residue dried to constant weight at 100° C. to give the weight of fibers dispersed. The contents of the filter flask are filtered after the test and dried to yield the weight of undispersed fibers. The per cent dispersibility is equal to 100 times the weight of fibers dispersed divided by the total weight of fibers recovered. Conventional toilet tissues have a dispersibility of 7%.

The wickability of a sample is determined by fastening the ends of a 2 x 5.5-inch strip to a perforated metal plate with rubber bands, resting the end of the plate under about 0.5 inch of distilled water at about 25° C. at an angle of 25° to the level of the water and noting the time in minutes for the water to wick the sample for a distance of 5 inches or less from the top of the water.

The following examples are cited to illustrate the invention. They are not intended to limit it in any manner.

Example 1

Conventional cotton linter sheets are steeped in caustic soda solution, and thereafter hydraulically pressed to a 3/1 (solids/liquids) press weight ratio. The sheets of alkali cellulose are then shredded, and held for subsequent processing in a refrigerated space at under 5° C. The cotton linter alkali cellulose so produced has the composition shown below:

| | Percent by wt. |
|---|---|
| Precipitatable cellulose | 31.2 |
| Sodium hydroxide | 15.75 |
| Water | 53.05 |

Twenty pounds of the above alkali cellulose are charged to a 12-gallon baratte. The baratte is rotated and warmed to an internal temperature of 25° C. at which time 2.13 pounds of carbon disulfide and 2.27 pounds of acrylonitrile is added over a ten-minute interval. During the simultaneous xanthation and cyanoethylation the temperature of the reaction mass is maintained at about 30° C. The reaction requires about 30 minutes and its termination is indicated by a cessation of the evolution of heat by the reaction mass. The cyanoethyl cellulose xanthate product is then dissolved in a 4% sodium hydroxide solution and cooled to 5° C.

The solution so formed is shear precipitated using the technique of U.S. Patent No. 3,114,747 and the equipment illustrated schematically in the figure wherein a single circumferential ring of twelve holes 2 having a diameter of 0.02 inch in a ⅛ inch tubing 1. An aqueous precipitant containing 5% by weight sulfuric acid and 15% by weight sodium sulfate is fed at a temperature of about 35° C. and under a pressure of about 120 pounds per square inch gauge. The cellulose ether is fed to the tube precipitator at 19° C. under a pressure of about 80 pounds per square inch gauge. The fibrous product is collected on a wire screen and compressed with a squeeze roller into a ½ inch thick mat. The particle mats are then stored at room temperature for at least 30 minutes to insure complete regeneration of the cyanoethyl cellulose and thereafter simultaneously neutralized and dewatered osmotically by being immersed and stirred in a bath containing 17 percent by weight of sodium sulfate and 2 percent by weight of disodium monohydrogen phosphate, adjusted to a pH between 5.0 and 6.0 After draining to approximately 10 percent by weight of solids, the mass is centrifuged to about 30 percent by weight solids. The particles, ready for further use, are analyzed for nitrogen content, to determine their d.s. (degree of substitution) which is found to be 0.42.

The product obtained in this manner is suitable for use in sheet formation, either alone, or as a binder for staple fibers. It is highly absorbent.

Example 2

The etherification technique of Example 1 is followed to provide a solution of cyanoethyl cellulose ether-cellulose xanthate in dilute alkali. The solution is stored at 0° C. for 16 to 24 hours before using.

The aged solution from above is filtered through a filter press, deaerated, heated to about 20° C. and pumped through candle filters to a spinneret having 2200 orifices of 0.003 inch diameter. The solution is extruded from the spinneret into a 48 inch long aqueous coagulating bath containing 9% $H_2SO_4$, 9% $ZnSO_4$, and 17% $Na_2SO_4$ at 60–65° C. The filament bundle is forwarded to a feed roll and a skew idler roll where regeneration of the yarn is completed. The regenerated yarn is forwarded to another feed roll-idler roll set where it is sprayed with a solution (35° C.) containing 17% $Na_2SO_4$ and 3% $Na_2HPO_4$ adjusted to a pH of 8.3 with NaOH to neutralize the acid in the yarn and keep it in a deswollen condition. The neutral yarn is passed through squeeze rolls to remove excess solution and then wound up on packages at 60 yards per minute.

A sample of the dry yarn contains 30.5% of salts and 19% soluble (at 10° C.) material. The dry yarn is soft and can be readily separated into the individual fibers. It can be cut to staple and processed as a conventional fiber. The yarn has the typical following properties calculated on a water-insoluble weight:

| | |
|---|---|
| Denier per filament (d.p.f.) | 2 |
| Tenacity, dry grams per denier (g.p.d.) | 1.7 |
| Elongation at the break, dry, percent | 9.7 |
| Tenacity, wet g.p.d. (25° C.) | 0.03 |
| Water absorbency g./g. | 14.4 |
| Urine absorbency g./g. | 11.0 |
| Nitrogen, percent | 3.1 |
| Degree of substitution (d.s.) cyanoethyl | 0.4 |
| COOH, percent | 0.5 |
| D.s. carboxyethyl | 0.018 |

When the salt neutralization step is omitted and the fiber is washed acid-free with water and dried, the resulting hard, stiff, film-like structure of fused fibers has little utility as a textile fiber. Cutting the dry product to staple length causes some chipping and fracturing of the brittle product. The cut product cannot be carded or separated for use as a textile fiber.

In a similar manner, acid bath regenerated fibers (1) from hydroxyethyl cellulose, and (2) from cyanoethyl cellulose prepared by adding acrylonitrile to viscose (British Patent No. 633,807) are neutralized.

Example 3

Thirty-three grams of rayon tow (1.5 d.p.f.) are steeped in 18% aqueous NaOH at 18° and pressed to a wet weight of 92 grams. The fibers are loosened by hand while protected from atmospheric $CO_2$ by a plastic bag and wound in a loose spiral on a 4 inch bobbin. The bobbin is rotated in a closed resin kettle at 50° and 18 grams of acrylonitrile (AN) is placed in the bottom of the kettle. The AN vapor is reacted with the cellulose and the resulting cyanoethyl cellulose is hydrolyzed to carboxyethyl cellulose by the alkali present. After 2 hours the product is acidified in a 5% sulfuric acid–15% sodium sulfate solution, then neutralized to the salt form in 3% sodium phosphate–17% sodium sulfate solution adjusted to a pH of 8.5.

The product has a carboxyl d.s. of 0.23 and a cyanoethyl d.s. of 0.034. The fiber is cut into ½-inch length staple. The moist mass contains 35.4 cellulosic materials, 92% of which is insoluble in 1% sodium sulfate.

Hand sheets are made by dispersing 3.95 grams of the above moist staple (equivalent to 1.288 grams of insoluble fiber) plus 0.43 gram of 0.25 inch rayon staple in 6 liters of water containing 1% by weight of sodium sulfate. A Noble and Woods sheet mold is used in the usual way. The wet waterleaf on the screen is too tender to handle and is dewatered by careful immersion in a 20% solution of sodium sulfate. The deswelled sheets are then couched between blotters and dried on a hot plate at 125° C. The dried sheets are smooth, white and flexible and can readily be redispersed in water. Sheets dried without first deswelling are crinkled, translucent and horny. They cannot be readily redispersed in water.

Example 4

Surgical cotton is hydroxyethylated by treatment with caustic soda and ethylene oxide in turn to obtain a d.s. of 0.7 with an absorbency of 15 g./g. in ice tap water. The fiber is then neutralized in 3% $Na_2HPO_4$, 16% $Na_2SO_4$ solution with $H_2SO_4$ added to a pH of 7 to 8. Hand sheets are made containing 75% of the above fiber and 25% of 0.25 inch rayon staple. The sheets are dewatered for 10 minutes in an aqueous 20% sodium sulfate solution.

Any method of accomplishing intimate contact between the aqueous buffered salt solution and the gel fiber is suitable, such as by immersion, preferably with agitation, or spraying. The period of contact need not be long for most purposes. Periods as high as 5 minutes or longer are highly advantageous for highly swollen fibers although contact periods as short as 3 to 10 seconds will often accomplish noticeable results. Excess salt solution may be removed by mechanical means such as wringing or centrifuging or by application of heat to remove water. Salt deposited upon the fiber upon removal of water may be removed mechanically such as by shaking, scraping or working the fiber, sheet or fabric of which the fiber constitutes an element. For many applications removal of excess salt is not necessary, since presence of salt does not appear to influence the softness of the resulting product.

The dry, fibrous products of this invention are valuable for use as absorbing pads for body fluids in a relatively unbonded form such as papers, batts, webbs, etc., or they can be bonded into integral structures which have adequate strength and durability in use and are suitable for disposal in sewage systems after use.

Many equivalent modifications of the present invention will become apparent to those skilled in the art from a reading of the above without a departure from the inventive concept.

What is claimed is:

1. A process for neutralizing a highly swellable, hydrophilic gel fiber of a cellulose derivative which comprises intimately contacting the freshly formed unswollen fiber with an aqueous, concentrated, buffered salt solution, the said salt solution having a pH in the range of from about 5.0 to about 9.0.

2. The process of claim 1 wherein the said derivative is an ether.

3. The process of claim 2 wherein the said ether is a cyanoethyl ether.

4. The process of claim 1 wherein the said aqueous salt solution comprises from about 15% to about 30% by weight of $Na_2SO_4$ in water and as a buffer, disodium hydrogen phosphate.

5. The process of claim 1 wherein the said neutralizing is an acidifying reaction.

6. The process of claim 1 wherein the said neutralizing is an alkalizing reaction.

7. The process of claim 1 wherein the said fiber is in a regenerated form.

8. The process of claim 1 wherein the said fiber is substantially in the form of its original morphology.

References Cited

UNITED STATES PATENTS

| | | | |
|---|---|---|---|
| 2,472,877 | 6/1949 | Allquist | 8—137.5 X |
| 2,479,605 | 8/1949 | Denyear | 8—137.5 |
| 2,902,334 | 9/1959 | Milne | 264—188 |
| 3,146,116 | 8/1964 | Bates | 264—182 |
| 3,154,614 | 10/1964 | Otsu et al. | 264—188 |
| 3,194,861 | 7/1965 | Bley | 264—188 |

M. WEINBLATT, *Primary Examiner.*

U.S. Cl. X.R.

106—165, 169, 164, 197, 231; 264—182, 188